United States Patent
Hannula

(10) Patent No.: US 10,762,165 B2
(45) Date of Patent: Sep. 1, 2020

(54) PREDICTING QUALITY OF AN INFORMATION SYSTEM USING SYSTEM DYNAMICS MODELLING AND MACHINE LEARNING

(71) Applicant: Qentinel Oy, Espoo (FI)

(72) Inventor: Esko Hannula, Espoo (FI)

(73) Assignee: Qentinel Oy, Espoo (FI)

(*) Notice: Subject to any disclaimer, the term of this patent is extended or adjusted under 35 U.S.C. 154(b) by 252 days.

(21) Appl. No.: 15/813,604

(22) Filed: Nov. 15, 2017

(65) Prior Publication Data

US 2019/0108196 A1 Apr. 11, 2019

(30) Foreign Application Priority Data

Oct. 9, 2017 (FI) .................................. 20175885

(51) Int. Cl.
| | |
|---|---|
| *G06F 17/18* | (2006.01) |
| *G06N 3/08* | (2006.01) |
| *G06K 9/62* | (2006.01) |
| *G06N 20/00* | (2019.01) |

(Continued)

(52) U.S. Cl.
CPC .......... *G06F 17/18* (2013.01); *G06F 11/3452* (2013.01); *G06F 16/219* (2019.01); *G06K 9/6256* (2013.01); *G06N 20/00* (2019.01)

(58) Field of Classification Search
CPC .... G06F 17/18; G06F 11/3452; G06F 16/219; G06N 20/00; G06N 5/025; G06N 5/003; G06N 3/08; G06K 9/6256

See application file for complete search history.

(56) References Cited

U.S. PATENT DOCUMENTS

| 7,519,566 B2 | 4/2009 | Priogin et al. |
| 2005/0125390 A1 | 6/2005 | Hurst-Hiller et al. |
| 2012/0102043 A1 | 4/2012 | Verma |

(Continued)

FOREIGN PATENT DOCUMENTS

| EP | 2770462 A1 | 8/2014 |
| EP | 3188093 A1 | 7/2017 |

OTHER PUBLICATIONS

European Search Report prepared by the European Patent Office for EP 18199264, dated Mar. 28, 2019, 3 pages.

(Continued)

*Primary Examiner* — Toan M Le

(74) *Attorney, Agent, or Firm* — Chernoff Vilhauer LLP

(57) ABSTRACT

A method of performing predictive analysis on an external index number describing quality of an information system based on a dynamic causal loop diagram of a plurality of quality meters describing the information system is disclosed. In an aspect, one or more quality meters are selected (402) from the plurality of quality meters for predicting values of an external index number. Values of selected quality meters and the external index number maintained (401) in a database are processed (403) using one or more statistical analysis methods to determine dependencies between the plurality of quality meters and the external index number. Based on the processing, a prediction model for predicting external index number values is established (404). Said model may be trained (406) based on received training data (405) using machine learning tools.

18 Claims, 8 Drawing Sheets

(51) Int. Cl.
*G06F 16/21* (2019.01)
*G06F 11/34* (2006.01)

(56) References Cited

U.S. PATENT DOCUMENTS

| | | |
|---|---|---|
| 2012/0166888 A1 | 6/2012 | Kiesel |
| 2012/0269441 A1 | 10/2012 | Marchesotti et al. |
| 2015/0199148 A1 | 7/2015 | Hrischuk et al. |
| 2015/0347940 A1 | 12/2015 | Doganata et al. |
| 2016/0342707 A1* | 11/2016 | Drobek ............... G06F 16/9024 |
| 2017/0052867 A1 | 2/2017 | Hannula |
| 2017/0243122 A1 | 8/2017 | Komatsu et al. |

OTHER PUBLICATIONS

Search Report prepared by the Finnish Patent and Registration Office for FI 20175885, dated May 21, 2018, 2 pages.

\* cited by examiner

PREDICTING QUALITY OF AN INFORMATION SYSTEM USING SYSTEM DYNAMICS MODELLING AND MACHINE LEARNING

CROSS-REFERENCE TO RELATED APPLICATION

This application claims priority to Finnish patent application no. 20175885 filed on Oct. 9, 2017, the content and disclosure of which is hereby incorporated by reference in its entirety.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

FIELD OF THE INVENTION

The present invention relates to information systems and more specifically to predicting quality of an information system.

BACKGROUND OF THE INVENTION

The following background description art may include insights, discoveries, understandings or disclosures, or associations together with disclosures not known to the relevant art prior to the present invention but provided by the present disclosure. Some such contributions disclosed herein may be specifically pointed out below, whereas other such contributions encompassed by the present disclosure the invention will be apparent from their context.

An information system (IS) is any combination of information technology and people's activities using that technology to support operations, management, and decision-making. An information system uses an integrated set of components for collecting, storing, and processing data and for delivering information, knowledge, and digital products. An information system typically comprises a data processing apparatus, a data transfer apparatus and programs. The purpose of the information system is to produce information which may be used to optimize or facilitate some action or make it possible in general with the help of the data processing.

The quality of an information system is often divided into dimensions of quality, for example, technical quality, process quality, perceived or experienced quality and business quality. While some of the dimensions may be easily evaluated based on just direct online measurements of different meters or indicators, for others this may be more difficult or they may be commonly assessed using well-established metrics which cannot be directly calculated based on data produced by the information system. For example, perceived or experienced quality describing the quality perceived by the user may be difficult to evaluate accurately without conducting extensive and often time-consuming user surveys. Due to time demands of surveying, the resulting data is always describing the past, not the present. Even though the information system may produce up-to-date information relating to the perceived quality of the information system, isolating this contribution, evaluating its effect and assessing the resulting quantity against the well-established metrics based on surveying the users is difficult.

BRIEF SUMMARY OF THE INVENTION

The following presents a simplified summary of features disclosed herein to provide a basic understanding of some exemplary aspects of the invention. This summary is not an extensive overview of the invention. It is not intended to identify key/critical elements of the invention or to delineate the scope of the invention. Its sole purpose is to present some concepts disclosed herein in a simplified form as a prelude to a more detailed description. According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments provide methods, an apparatus and a computer program product for predicting an external index number describing an information system.

BRIEF DESCRIPTION OF THE SEVERAL VIEWS OF THE DRAWINGS

In the following the invention will be described in greater detail by means of preferred embodiments with reference to the attached drawings, in which.

DETAILED DESCRIPTION OF THE INVENTION

Figure 1:
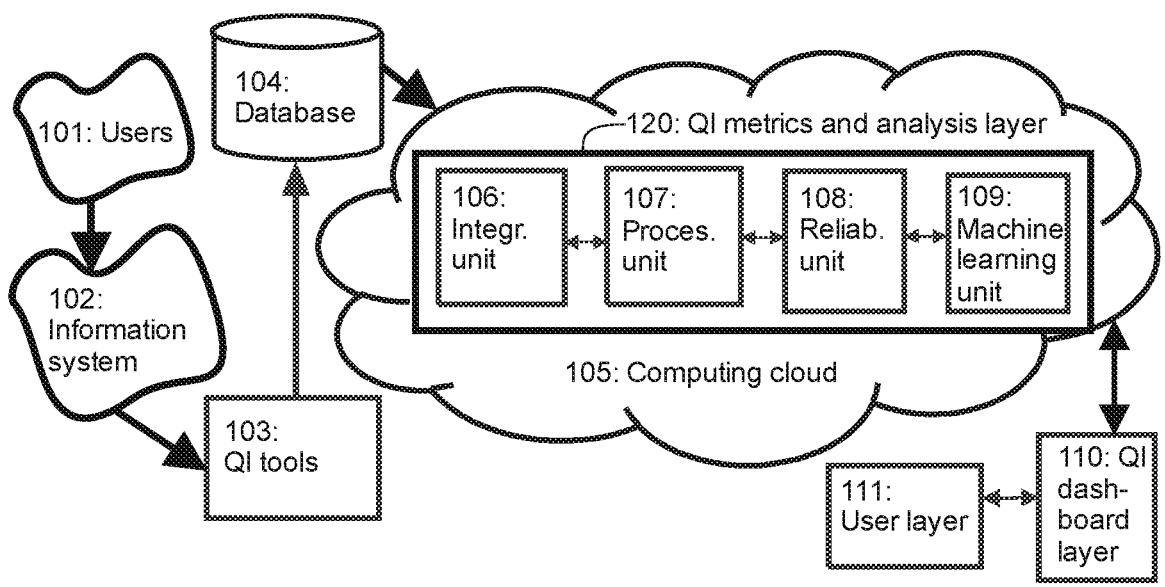
FIG. 1 illustrates a system according to an embodiment of the invention.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, the invention and its embodiments will mainly be described in connection with an information system (IS) comprising one or more information technology systems, communications systems and access networks. An information system may be any combination of information technology and people's activities using that technology to support operations, management, and decision-making. In simple terms, an information system is a group of components that interact to produce information. An information system typically comprises a data processing apparatus, a data transfer apparatus and programs. The purpose of the information system is to increase or facilitate some action or make it possible in general with the help of the data processing. The information system can be any information system comprising hardware and/or software in different data processing apparatus, data transfer apparatus and programs, any combination of information technology and people's activities using that technology to support operations, management, and decision-making.

Said information system can thus be defined to be a network of many different information and/or communications systems and methods. However, the invention and its embodiments are not restricted to the number of information technology systems or communications systems or access networks. Also, regarding the invention, the operation and structure of information technology systems, communications systems and access networks are described only to a degree that will assist in comprehending the invention and its embodiments.

The embodiments of the present invention aim to solve at least some of the problems described in the background section using system dynamics (SD) analysis and machine learning tools based on the information produced by an information system. System dynamics examines the wholeness of different variables as a complex system. The variables interact with each other. In system dynamic modelling one or more, even a small factor in certain circumstances effects intensively to the other factors. Also the cause and effect relations do not proceed hierarchically. In the system dynamic modelling causal models can be created, which describe the effect of different subfactors of the system, e.g., on one or more processes of a company. Different values paths can be derived from the causal models and based on these causal models system dynamic models can be derived using prior art system dynamic methods.

Machine learning, on the other hand, relates to the study and construction of algorithms that can learn from data fed to them. In cases where source data behaves in unexpected and irregular ways as function of, for example, time, creating an analytical model for the data and programming that model into an algorithm may be difficult by a human. In such cases, machine learning offers a possibility for realizing a complex algorithm to fit the data enabling also predicting the future behaviour of said data. Machine learning is based on recognizing patterns in the data. For this purpose, lots of data (so-called training data) is needed in order to generate a reliable prediction algorithm. In general, the more training data is available, the more reliable and repeatable the results produced by the algorithm are. The invention and its embodiments are not specific to the particular information technology systems, communications systems and access networks, but it will be appreciated that the present invention and its embodiments have application in many system types and may, for example, be applied in a circuit switched domain, e.g., in GSM (Global System for Mobile Communications) digital cellular communication system, in a packet switched domain, e.g. in the UMTS (Universal Mobile Telecommunications System) system, and e.g. in networks according to the IEEE 802.11 standards: WLAN (Wireless Local Area networks), HomeRF (Radio Frequency) or BRAN (Broadband Radio Access Networks) specifications (HIPERLAN1 and 2, HIPERACCESS). The invention and its embodiments can also be applied in ad hoc communications systems, such as an IrDA (Infrared Data Association) network or a Bluetooth network. In other words, the basic principles of the invention can be employed in combination with, between and/or within any mobile communications systems of $2^{nd}$, $2,5^{th}$, $3^{rd}$, and $4^{th}$ generation, such as GSM, GPRS (General Packet Radio Service), TETRA (Terrestrial Trunked Radio), UMTS systems, HSPA (High Speed Packet Access) systems e.g. in WCDMA (Wideband Code Division Multiple Access) technology, and PLMN (Public Land Mobile Network) systems. Different meters can be used in the information system with wireless network(s) and in the information system with wired network(s). The meters can also be used in other parts of the information system e.g. when making user satisfaction surveys.

Communications technology using IP (Internet Protocol) protocol can be, e.g., the GAN technology (General Access Network), UMA (Unlicensed Mobile Access) technology, the VoIP (Voice over Internet Protocol) technology, peer-to-peer networks technology, ad hoc networks technology and other IP protocol technology. Different IP protocol versions or combinations thereof can be used.

The quality of the information system can be established and measured as a function of dimension, perspectives, zones, or data sources. Said dimensions, perspectives, zones, or data sources can have many technical aspects. In addition to these technical aspects the dimensions can have one or more non-technical aspects, which can be called soft meters, like the usability of the system. These non-technical aspects can be said to be such quantities that cannot be measured in a first step with SI units as separated to so-called hard meters. In the embodiments of the invention, both hard meters and soft meters may be utilized and combined.

The dimension can be defined as a construct whereby objects or individual quantities can be distinguished. These dimensions can define the variables or parameters for the quality. The variables can change slowly or rapidly as a function of time, and some of the variables can even have a constant value. A low frequency change can occur, e.g., weekly, yearly and a high frequency change can occur, e.g., in every second or even faster than that. Data with low frequency change can be e.g. user evaluation data and data with high frequency change can be, e.g., data produced by a network monitoring system. The number of the dimensions is normally between two and seven, preferably between three and five and most preferably four. The dimensions and their number can be predefined, but one can also remove or add dimensions to the calculation of the quality of the information system in real time.

FIG. 1 shows a block diagram illustrating a system according to an embodiment of the invention. The information system 102 in FIG. 1 may be, e.g., an ecommerce system or an enterprise resource planning system. The information system may be based on a system described in more detail in a US patent application publication No. 2017/0052867, assigned to the applicant and hereby incorporated by reference. The US patent application publication No. US 2017/0052867 describes how to integrate system dynamics modelling into information system quality measurements to determine quality of an information system.

The information system 102 may comprise one or more information technology systems, communications systems and access networks. The information system can be any information system comprising hardware and/or software in different data processing apparatus, data transfer apparatus and pro-grams, any combination of information technology and people's activities using that technology to support operations, management, and decision-making. Said information system may thus be defined to be a network of many different information and/or communications systems and methods.

The information system 102 can have many users which connect to the information system 102 using user equipment 101. Users may be internal and/or external to the system. The internal users are those like in said enterprise resource planning system and the external users those like in said e-commerce system, but as mentioned, said systems can also have both internal users and external users.

The user equipment 101 that can use the information technology system can be, e.g., any conventional portable or non-portable computing devices (apparatus) that can connect to a wireless local area network. Computing devices (apparatuses) which may be employed include wireless mobile communication devices operating with or without a subscriber identification module (SIM) in hardware or in software, including, but not limited to, the following types of devices: desktop computer, laptop, touch screen computer, mobile phone, smart-phone, personal digital assistant (PDA), handset, e-reading device, tablet, game console, note-book, multi-media device, sensor, actuator, video camera, car, wearable computer, telemetry appliances, and tele-monitoring appliances. The user equipment can be equipped with a wireless local area network service and/or capable to communicate any other short-range communications media. A wireless local area network WLAN is a network in which the mobile user can connect to the local area network through a wireless connection. This kind of user equipment can be described as two-mode user equipment.

The user equipment can comprise means for processing, e.g., at least one of the following messages: a short message, an instant message, an e-mail message, a multimedia message, a unified messaging message, a WAP (Wireless Application Protocol) message or an SIP (Session Initiation Protocol) message. The mobile stations can also be mobile stations equipped with e.g. an instant message, an e-mail message, a multimedia message, a unified messaging message, a WAP message or an SIP message service and the services like voice calls, wireless Internet browsing, and web broadcasting, and these messages and message services can be used when using IS.

The quality of the information system 102 can be viewed and followed with many different tools. These tools, called quality intelligence (QI) tools 103, can comprise, e.g., network monitor programs, programs measuring the performance of the information system, tools of statistical or static code analysis, user feedback tools, testing automation tools, machine learning tools and other tools. In some embodiments, the quality intelligence tools 103 may also comprise tools for real-time streaming of audio, video, text and/or other data.

The tools provide data and/or information, which can be sent or conveyed to a data warehouse 104, and stored therein. The data warehouse 104 can be, e.g., a database external or internal to the information system. In some embodiments, the data warehouse 104 may be a cloud database running in the computing cloud 105 or in some other computing cloud. The data warehouse 104 of the information system 102 can be in a two-way connection or communication with the tools layer and with the metrics and analysis layer of the computing cloud 105.

The QI tools 103 can be independent, each processing a measurement of the information system independently of the other tools. This means that each tool can take a sample of the information flow and/or data flow of the information system. Alternatively, a tool can use the result of one or more other tools as a starting point of its measurements. The QI tools may also be called QI meters though, in the following, the term "meter" is used exclusively to refer to meters of the QI metrics and analysis layer 120 of the computing cloud 105 for clarity.

A so-called ETL (Extract, Transform, Load) process can be included in the storing step. With the help of this data consolidation and integration process, data can be stored to the data warehouse according to a QI data model. The data model defines the data format of the data to be stored. It can also create a structure to the data and/or information provided by the information system. In this phase, it is also possible to handle the data and combine it seamlessly independent of the original source of the data/information.

In the invention and its embodiments, the computing cloud 105 comprises a QI metrics and analysis layer 120. The layer 120 provides the intelligence of the system. The layer can comprise a plurality of meters and/or instrumentations for quantifying in different ways the information contained in the raw data which is provided by the QI tools 103 and stored to the data warehouse 104. The meters may be equivalently called quality meters as they evaluate certain aspect(s) of quality of the information system. The plurality of quality meters may comprise reflective meters and/or formative meters as well as soft meters and/or hard meters. The quality meters may measure only one quantity or alternatively they may measure multiple quantities. The data generated by the plurality of quality meters and/or instrumentations may be maintained in the data warehouse 104. The generated data may comprise metadata comprising information on, for example, data type, location where data was acquired, time and date of data and to which pre-defined category data belongs.

One or more of the plurality of quality meters and/or instrumentations may be defined using one or more application programming interfaces of one or more machine learning tools. The one or more machine learning tools may be integrated into the information system 102 or they may be comprised in the computing cloud 105.

In some embodiments, a non-cloud-based apparatus or a plurality of connected apparatuses may be used instead of the computing cloud to realize the functions of the computing cloud 105.

The dimensions of quality present in the QI metrics and analysis layer 120 may comprise, for example, technical quality, process quality, perceived or experienced quality and business quality. The business quality can also be defined to be utility and/or usefulness. The QI metrics and analysis layer 120 may provide one or more metrics (index numbers) representing the quality of the information system by using the method, apparatus, and system of the invention and its embodiments. The method can also be called a quality intelligence method. The calculation of said metric will be described in detail, in the following. The metric may be the Net Promoter Score or some other metric relating to customer satisfaction.

In addition to providing the intelligence to the system, the QI metrics and analytics layer 120 is arranged to receive the initial model, diagram or topology of quality elements for the information system, receive real time data for one or more quality meters of the model, calculate new relations or interactions or interdependencies and/or new topology of the initial model, diagram or topology at least partly based on the receiving of online real time measurement data, and validate and/or update initial model, diagram or topology.

The model, the topology or the diagram to possibly be amended can be a first model, a current model or the initial model. Data to be received can be real time data and/or online data and/or continuous time data and/or discrete time data. It is to be noted that there can exist two or more quality meters which can receive data and whose relations or interactions to one or more other quality meters or to all quality meters can be calculated and analysed. The interaction between any two quality meters may comprise a connection between the two quality meters and a direction of the connection between the two quality meters. It can additionally comprise the strength or strength value of the connection.

In one embodiment of the invention, the QI metrics and analysis layer 120 has four units: an integration unit 106, a processing unit 107, a reliability unit 108 and a machine learning unit 109. The units 106, 107, 108, 109 may communicate and share data with each other.

The unit, into which a cause and effect model or a causal loop model or the system dynamic SD model or a causal loop diagram (CLD), which will be used in the following, may be inserted, is the integration unit 106 of the QI metrics and analytics layer 120. In other words, the integration unit 106 may receive the initial model and initial values for parameters or correlations. This unit can thus handle the model together with accumulating measurement data.

The processing unit 107 is arranged to receive real time or online measurement data from the data warehouse 104 or directly from the data collection unit 103 and examine said measurement data with respect to the plurality of quality meters and/or instrumentations as described previously. The processing unit 107 may also be arranged to receive and examine past measurement data stored in the data warehouse 104 as history data.

The reliability unit 108 is arranged to estimate or calculate the parameters of one or more cause and effect models. This can be done, e.g., by means of one or more statistical analysis and statistical and visual analysis. The statistical analysis used for implementing the calculations can comprise, e.g., descriptive statistical analysis like range, amplitude, average, means, distributions and/or correlation analysis, and/or regression analysis and/or sensitivity analysis variances and/or statistical significance testing and/or machine learning techniques. The unit is also adapted to visualize the points in the dynamic model, which are reliable and/or valid or the points, which accurately correspond real online data or real time measurement data, and the points in said model which are not reliable or valid or which do not accurately correspond real online data or real time measurement data. Furthermore, the unit can also be adapted to visualize those points, in which the cause and effect relations are different to the supposed ones or opposite to them.

The reliability unit 108 is also arranged to receive (new) training data and/or past training data stored in the data warehouse 104 as history data relating to an external index number or external index numbers describing the quality of the information system 102 or one or more dimensions of quality of the information system 102. The training data and the history data may be received from the data warehouse 104. The training data and the history data may be stored to the data warehouse 104 by the information system 102. The training data may be data acquired originally through external means, that is, not directly via the information system 102 though it may still be input to the information system 102 and stored to the data warehouse 104 by the information system 102. While the quality intelligence tools 103 may produce data relating indirectly to the external quality metric (also called external index number), the value of the external quality metric may not be easily determined from data using the plurality of quality meters and/or instrumentations. For example, the external quality metric may have been derived by conducting surveys on the users of the information system 102. The training data may also comprise values of at least some of the plurality of quality meters and/or instrumentations corresponding to the time and date when the external quality metric was acquired or "measured". In some embodiments, the training data may comprise metadata comprising information on, for example, data type, location where data was acquired, time and date of data and to which pre-defined category data belongs. In said embodiments, the values of the plurality of quality meters and/or instrumentation corresponding to information in the metadata, for example, time and date, may be acquired from the data warehouse 104 upon request by the reliability unit 108.

In an embodiment, the reliability unit 108 is arranged to analyse the dependencies and/or correlations between each of the plurality of quality meters and the external index number based on the history data stored in the data warehouse 104 using one or more statistical analysis method. For example, the reliability unit 108 may perform regression analysis. In some embodiments, only some of the quality meters comprised in the plurality of quality meters are selected by the reliability unit 108 for the regression analysis or other statistical analysis. The selection may be based, for example, on pre-defined categories for the plurality of quality meters. For example, if the external index number relates to perceived quality of the information system, only the quality meters which may have an effect on the perceived quality may be chosen. The cause and effect model and information contained therein may also be used in the selecting. The reliability unit 108 may be arranged to establish a prediction model for the external index number based on the results of the statistical analysis. The results may also be integrated into the cause and effect model.

The machine learning unit 109 may be arranged to use one or more machine learning tools to perform analysis on the prediction model. Moreover, the machine learning unit 109 may be arranged to use the one or more machine learning tools to analyse the dependency of the external quality metric on the plurality of quality meters and instrumentation based on the training data and the results of the statistical analysis produced by the reliability unit 108. The one or more machine learning tools may be based on any established or future machine learning or pattern recognition algorithms using, for example, decision tree learning, association rule learning, artificial neural networks, representation learning, clustering and deep learning.

The machine learning unit 109 may comprise one or more application programming interfaces (APIs) such as image analysis APIs, video analysis APIs, emotion recognition APIs, speech recognition APIs, semantic or text analysis APIs and web analytics APIs. The machine learning unit 109 may use the one or more machine learning tools in conjunction with one or more APIs to produce one or more additional quality meters for evaluating the quality of the information system. Alternatively, the results from the APIs may be integrated into existing quality meters or they may be separate from the plurality of quality meters and the cause and effect model, providing additional information for the users of the QI system for evaluating quality of the information system 102, the cause and effect model or the prediction model.

The layer 110 shown in FIG. 1 is a so-called QI dashboard layer. It can provide the users of a QI system a real time view of the value of the quality of the information system (e.g., via a display). Moreover, it may enable the users to examine the results produced by the prediction model and the machine learning tools and perform additional calculations using them. It may also allow certain users to modify the cause and effect model, prediction model for the external index number or the machine learning tools and perform data analytics on the data produced by the QI metrics and analysis layer 120.

The QI system can have many different users or user roles, and the users can see a view of the quality of the system, which is important to them. The users or user groups are illustrated in FIG. 1 as the user layer 111. The users may select the view or adapt it to some specific purposes suitable to them. The user roles layer may be linked to the dashboard, which can be linked to metrics and analysis layer, both of said links being either single-way links or multi-way links.

All or some of the layers 103-110, 120 may also be part of the information system.

Alternatively or in addition to the links of the QI metrics and analysis layer 120 to the data warehouse shown in FIG. 1, the QI metrics and analysis layer 120 may have one or more direct links to the information system 102 and/or to one or more other external information systems.

The blocks on the QI metrics and analysis layer 120 can be independent blocks and can comprise independent quality meters.

Figure 2:
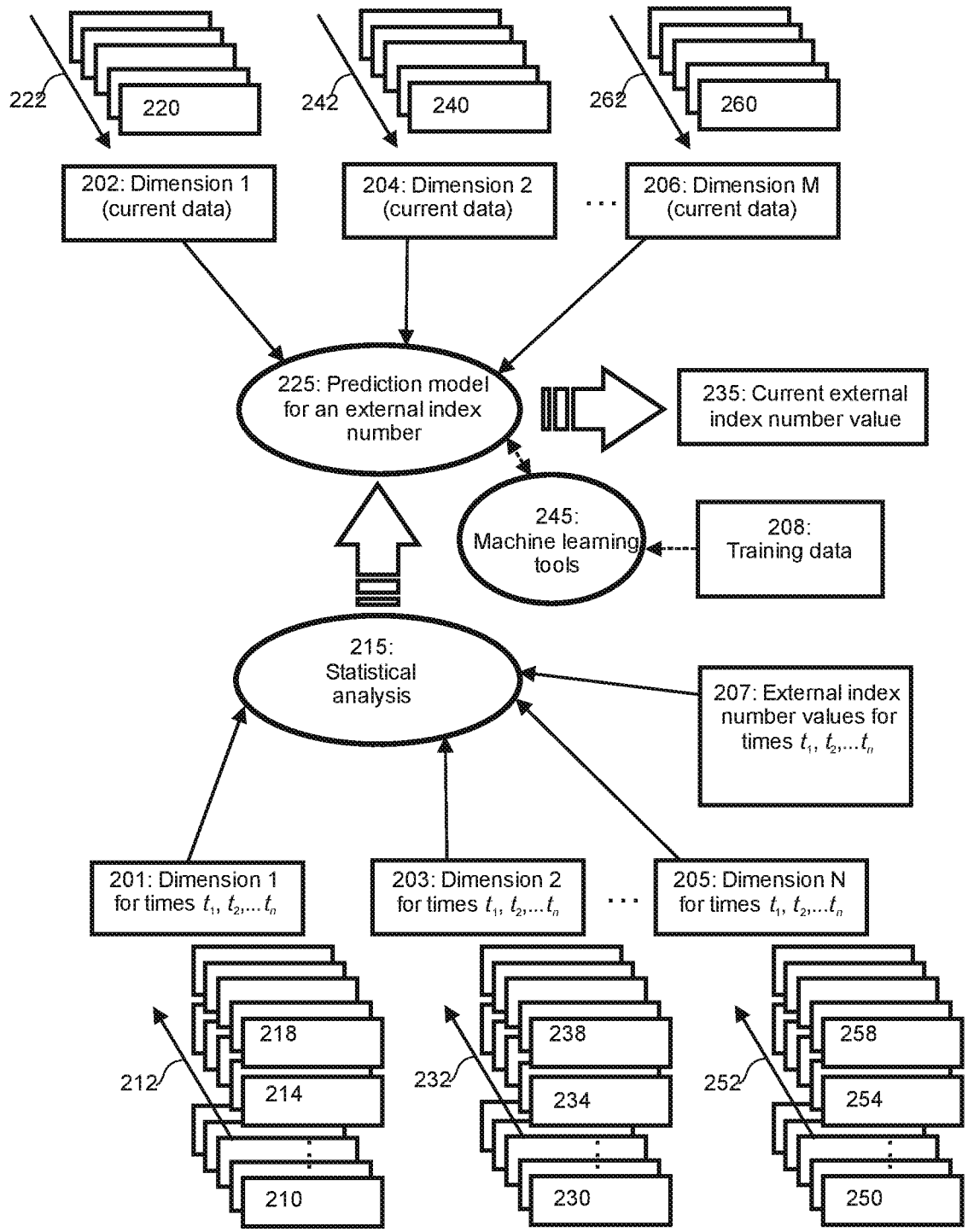
FIG. 2 illustrates an embodiment of the calculation process in the metrics and analysis layer of the invention.

FIG. 2 illustrates how the current external index number 235 relating the quality of the information system is calculated by the QI metrics and analysis layer in the computing cloud and which data may be used for said calculation. Such a calculation may be especially useful in cases where the plurality of quality meters are updated in real-time or with a high frequency while new external index number values are acquired at much longer intervals, e.g., once every three months, that is, realtime data for the external index number is not available.

An important aspect of this calculation are the plurality of quality meters comprised in the QI metrics and analysis layer. Each quality meter measures one or more quantities 210, 220, 230, 240, 250, 260 relating to the quality of the information system from one or more sources within the information system. The one or more quantities may be measured automatically, semi-automatically or manually with different or equal frequencies and the one or more sources may comprise technical and non-technical sources. Each quantity corresponds to one or more dimensions of quality 201, 202, 203, 204, 205, 206, each dimension of quality describing a certain aspect of the quality of the information system. Each quantity may correspond directly to the measured quantity or it may be normalized to a target value (that is, a quantity ratio may be generated). Index numbers representing each single dimension of quality may be calculated by using one or more mathematical algorithms. The one or more mathematical algorithms may comprise, for example, algorithms calculating an average value from the weighted quantity ratios and/or quantities assigned to the dimension.

The lower half of FIG. 2 illustrates how history data relating to values of the external index number and the plurality of quality meters may be used for generating a prediction model for an external index number 235. The history data comprises values for the external index number 207 and sets of values 210, 214, 218, 230, 234, 238, 250, 254, 258 for the plurality of quality meters (or for some of the plurality of quality meters), both corresponding to time instances $t_1, t_2, \ldots t_n$. The operations illustrated by arrows 212, 232, 252 may correspond to calculating the index number of the dimensions of quality and/or simply organizing the quantities under the dimensions. Therefore, each element 201, 203, 205 should be understood to comprise the index number of the dimension and/or values of the quantities comprised in the dimension (preferably both) for the time instances $t_1, t_2, \ldots t_n$. The data comprised in the elements 201, 203, 205, 207 is used for performing statistical analysis in element 205 to evaluate the correlation or dependency between each quantity and/or each dimension and the external index number. The correlation or dependency may be evaluated in each case by calculating at least one value for a coefficient indicating a statistical relationship involving dependence between two variables. For example, the coefficient may be a linear correlation coefficient indicating the extent to which two variables have a linear relationship such as a Pearson product-moment correlation coefficient (commonly called simply "the correlation coefficient"), any non-linear correlation coefficient, linear regression coefficient or non-linear regression coefficient. The dependency coefficient may also be defined as the absolute value of any of the aforementioned coefficients. A prediction model 225 for the external index number is established based on said analysis. Thereafter, training data 208, comprising values for the external index number and at least some of the plurality of quality meters, may be used for training the prediction model 225 for the external index number value using one or more machine learning techniques implemented using one or more machine learning tools 245. The prediction model 225 may be updated based on the training to improve the accuracy of the prediction model. Any history data used for creating the prediction model may also be used in the training. Details of how the prediction model 225 is generated in 215 will be described in detail in relation to FIGS. 3 and 4.

The top half of FIG. 2 illustrates how the current external index number is calculated using the prediction model 225. The elements 202, 204, 206 correspond to the elements 201, 203, 205 except for the fact that the former elements represent only the most recent values for the quantities measured by at least some of the plurality of quality meters (that is, a single time instance). It should be noted that different quantities may be measured with different frequencies and therefore the most recent values of the quantities may not have been measured simultaneously. In some embodiments, values of the quantities measured at multiple time instances may be used for the calculation. In other embodiments, current values of one or more quantities for which current data is not available may be may be calculated, for example, using an interpolation method based on previous values of said one or more quantities. The number of dimensions in the two cases may be equal (that is, N=M) though they may also differ. For example, it may be possible that only an imperfect data set of quality meter quantities is available for certain external index number values used for training. It may be detected in the analysis 215 that some of the quantities 210, 230, 250 have no effect on the external and therefore the created algorithm 225 is not dependent on them. The prediction model may correspond, for example, to a weighted sum of the index numbers of the dimensions or of certain quality meter quantities or their quantity ratios, weighing factors of the weighted sum having been defined in the analysis 215. The result of the calculation using the algorithm 225 is a value 235 for the external index number corresponding to the current state of the information system. In addition to the external index number itself, one or more metrics describing the uncertainty in the calculation of the external index number may also be calculated based on the prediction model. The calculated external index number and/or the one or more metrics describing the uncertainty in the calculation may be stored to the data warehouse.

Figure 3:
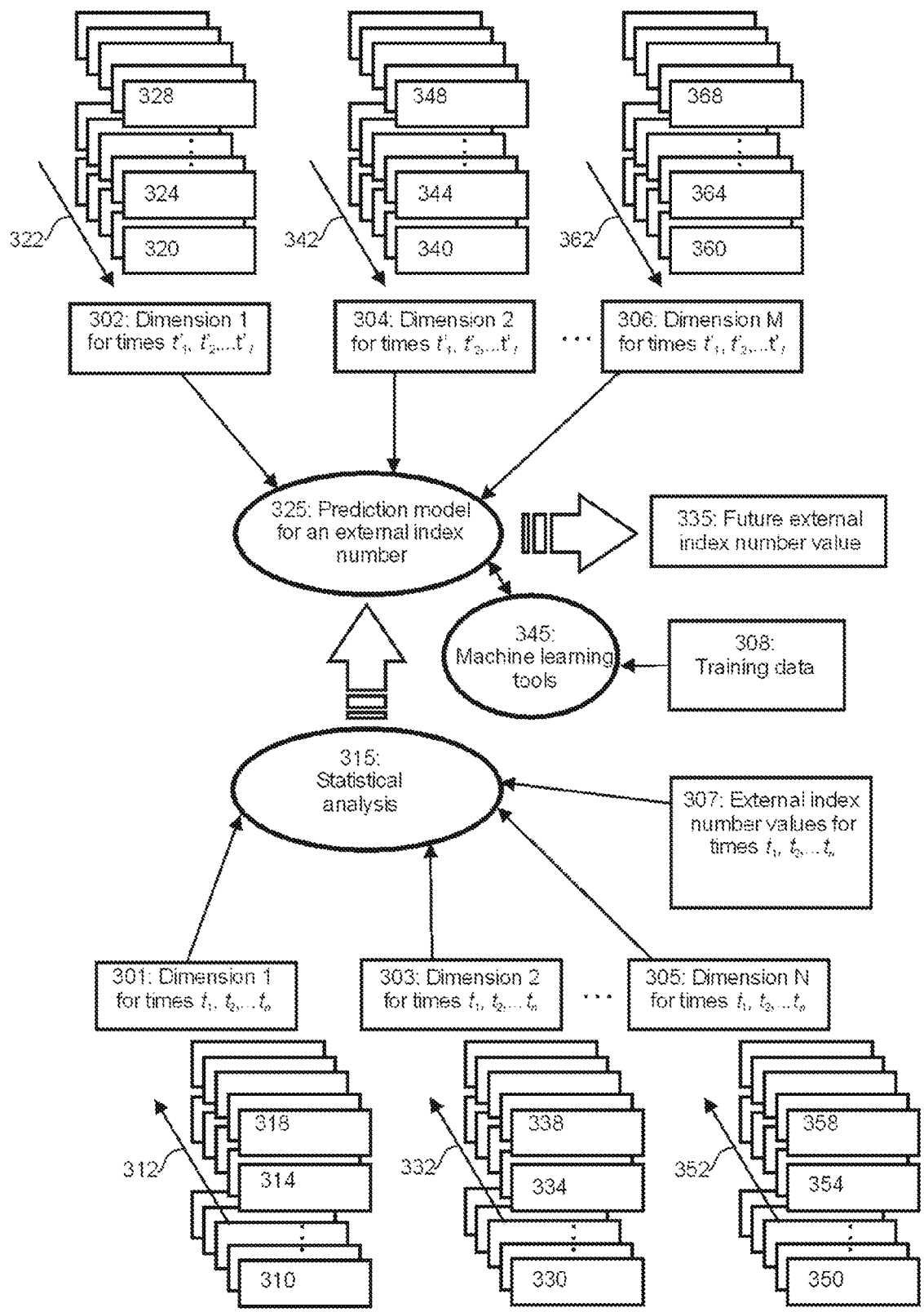
FIG. 3 illustrates an embodiment of the calculation process in the quality intelligence metrics and analysis layer of the invention.

An alternative example for performing calculations using the prediction model for the external index number is illustrated in FIG. 3. The elements in the lower half of FIG. 3, that is, elements 301, 303, 305, 307, 308, 310, 315, 312, 314, 318, 330, 332, 334, 338, 345, 350, 352, 354, 358, may be similar to the corresponding elements of FIG. 2 and therefore the discussion in relation said elements of FIG. 2 applies also to FIG. 3. However, the created prediction model is used differently in this example. While in the case of FIG. 2 an external index number value corresponding to the current external index number was calculated based on the current values for different quality meters, in FIG. 3 an external index number value corresponding to a future time instance is calculated based on values 310, 314, 318, 330, 334, 338, 350, 354, 358 of quality meters at time instances $t'_1, t'_2, \ldots t'_l$. Said time instances may correspond to, for example, l most recent values for the quality meters. Some of the time instances $t'_1, t'_2, \ldots t'_l$ may be equal to some of the time instances $t_1, t_2, \ldots t_n$. Similar to FIG. 2, training data 308, comprising values for the external index number and at least some of the plurality of quality meters, may be used for training the prediction model 325 for the external index number value using one or more machine learning techniques implemented using one or more machine learning tools 345. Such training may be especially necessary in this case to provide dependable results for the future external index number. As the accuracy of the prediction may be strongly dependent especially in this embodiment on various factor such as how much the prediction model has been trained, how regular the data analysed with quality meters is (that is, how easy to predict it is) and how far into the future the future external index number is to be calculated, evaluating the validity of the prediction by calculating one or more metrics describing the uncertainty in the calculation of the future external index number is especially important. The calculated future external index number and/or the one or more metrics describing the uncertainty in the calculation may be stored to the data warehouse.

The calculations as illustrated in FIGS. 2 and 3 enable not only the estimation of the current or future external index number, but also provide means for recognising how a change in a given quality meter affects the external index number both instantly and after a certain amount time has passed. For example, a change in a particular quality meter may not initially have any effect on the external index number, but it may cause at a high likelihood a huge change in the external index number in two weeks' time. Recognising such time delays between the quality meters and the external index number may be very beneficial in terms of improving the quality of the information system.

It should also be appreciated that the N dimensions defined by elements 201, 203, 205, 301, 303, 305 and/or the M dimensions defined by elements 202, 204, 206, 302, 304, 306 may comprise all or some of the dimensions of quality defined by the QI metrics and analysis layer and implemented in the cause and effect models for the information system. Moreover, some or all of the metric quantities of each dimension may be used. Which dimensions and quantities are used may be chosen based on how the external index number is defined. It should be appreciated that the external index number may relate one or more dimensions of quality. In other words, the external index number of the information system may represent the quality of the information system as a whole taking into account all technical and non-technical aspects of quality or it may represent only a certain aspects or certain aspects of quality. For example, the external index number may relate only to perceived quality. In such a case, only the quantities comprised in the perceived quality dimension may be included in the analysis. On the other hand, an opposite choice of using all the dimensions except the perceived quality in the analysis may be made to study how the other dimensions of quality reflect the perceived quality. In some embodiments, the same external index number may be calculated multiple times using multiple sets of different quality meters. In some embodiments, multiple different external index numbers may be defined. The machine learning tools may remove or add quantities or dimensions or change their definitions (e.g., change the target values of the quantity ratios) to improve accuracy of the prediction model as will be discussed in detail below.

In an embodiment, the external index number (or one of the external index numbers) relates to the perceived quality of the information system. The perceived quality, in turn, relates to user's opinion of the ability of the information system for fulfilling his or her expectations, i.e., user satisfaction. The perceived quality may be a measure of how products and services supplied by a company meet or surpass user or customer expectation. Assessing perceived quality is an essential element of the strategy of any business operating in a competitive marketplace where businesses compete for customers. User satisfaction data not only provides information on how the services or products of the company (that is, the information system) may be improved to increase user satisfaction and therefore sales but also provides an indicator for how the company is performing and will perform in the future.

In an embodiment, the external index number indicating perceived quality of the information system may be the so-called Net Promoter Score (NPS). NPS is a common metric used for estimating customer satisfaction or customer loyalty developed in 2003 by Fred Reichheld, Bain & Company and Satmetrix Systems. Typically, the NPS for a company, a product or a service is evaluated by conducting customer surveys. Contrary to the more traditional customer surveys, the NPS survey consist only of a single question: "How likely is it that you would recommend our company/product/service to a friend or colleague?" The scoring for this answer is most often based on a 0 to 10 scale. Those customers who give a score of 9 to 10 are called Promoters (likely to exhibit value-creating behaviour) and customers who give a score of 0 to 6 are called Detractors (unlikely to exhibit value-creating behaviour). The NPS itself has a value between −100 and +100 based on the number Promoters and Detractors, the former value corresponding to the case where every customer is a Detractor and the latter to the case where every customer is a Promoter.

While the NPS has proven to be a useful tool for assessing user or customer satisfaction and has been widely adopted, it has its problems. Some problems result from the fact that the NPS determination is practically always based on surveying users extensively. Conducting user surveys is relatively resource-intensive and time-consuming for the company due to which the period between the NPS evaluations is typically relatively long, for example, six months. Due to this, the NPS calculated based on surveys may be considered a so-called lagging indicator meaning that it describes past trends but not the present or future ones. Moreover, the simplicity of the NPS survey means that, even if provided the full data, the company is not able to analyse the factors which contribute to the NPS for a given product or service. Therefore, assessing which corrective course of action should be undertaken to improve the NPS (and therefore user satisfaction) may be difficult. The present invention seeks to solve these problems by providing a system as illustrated in FIG. 1 for predicting the NPS based on the provided training data which in this case corresponds to NPS values acquired through conventional means (that is, user surveys conducted online, by phone and/or in person). In other words, the present invention seeks to improve the ability of the QI metrics and analysis layer of the system to evaluate and predict the perceived quality of the information system compared to the prior art. In other embodiments, the external index number may also be any other metric describing user satisfaction.

Figure 4:
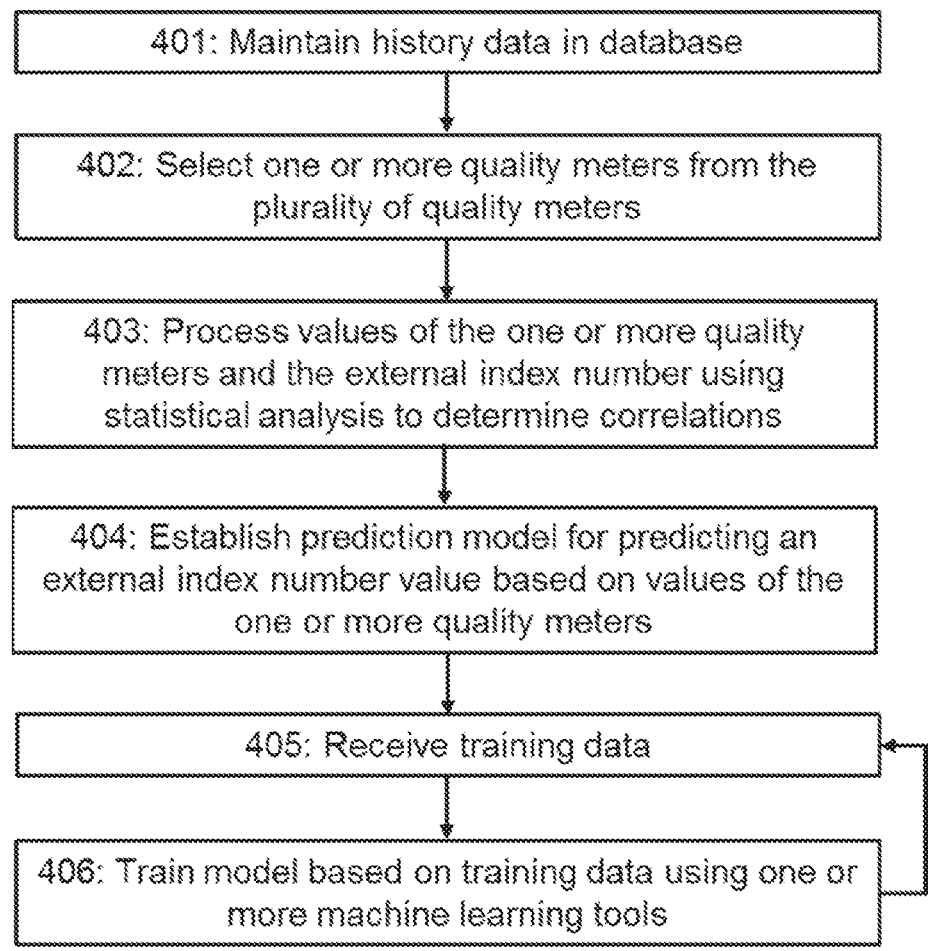
FIG. 4 illustrates a flow diagram according to an embodiment of the invention.

FIG. 4 illustrates a method for realizing and training a model predicting the values of external index number according to an embodiment of the invention. The method may be performed by the QI metrics and analysis layer 120 of FIG. 1 or some of the elements 106, 107, 108, 109 therein and the data warehouse 104. In the following, the entity performing the method (as well as the proceeding methods according to other embodiments) is called simply an analysis system for brevity.

Referring to FIG. 4, history data comprising information on past and present values of the plurality of quality meters and the external index number and interactions with their strengths between the plurality of quality meters is maintaining in a database (block 401). The database may correspond to the data warehouse 104 of FIG. 1. Then, the analysis system selects, in block 402, one or more quality meters from the plurality of quality meters for predicting values of the external index number. The selection may be based, for example, on metadata comprised in the external index number and/or quality meter data or cause and effect model (i.e., causal loop diagram) of the information system. The one or more quality meters may be selected, for example, such that only quality meters relating to certain dimension of quality are chosen. The analysis system processes, in block 403, values of the one or more quality meters and the external index number comprised in the history data using one or more statistical analysis methods to determine correlations between the plurality quality meters and the external index number. The one or more statistical methods may comprise, for example, regression analysis methods, correlation analysis and/or structural equations modelling and determining the correlation may comprise calculating a value for a coefficient indicating a statistical relationship involving dependence between two variables, in this case a quality meter and the external index number. The coefficient may be, for example, a linear or non-linear correlation or regression coefficient. The regression analysis methods may, in turn, comprise, for example, linear regression methods, non-linear regression methods, logistic regression methods, robust regression methods and partial least squares regression methods. Based on the processing, the analysis system establishes, in block 404, a prediction model for predicting external index number values based on one or more sets of values of the one or more quality meters. The prediction model may be based on, for example, polynomials and/or more complex functions.

After the prediction model has been established, the analysis system may after some time receive, in block 405, training data comprising at least one value for the external index number and one corresponding set of values for the one or more quality meters. The received training data may comprise newly acquired data not used in establishing the prediction model and/or history data which was already used in the establishing. The training data may be received from the database or some other source. Finally, the analysis system trains, in block 406, the prediction model using one or more machine learning tools based on received training data. This final step of block 406 is repeated every time a new set of training data is received in block 405.

Figure 5:
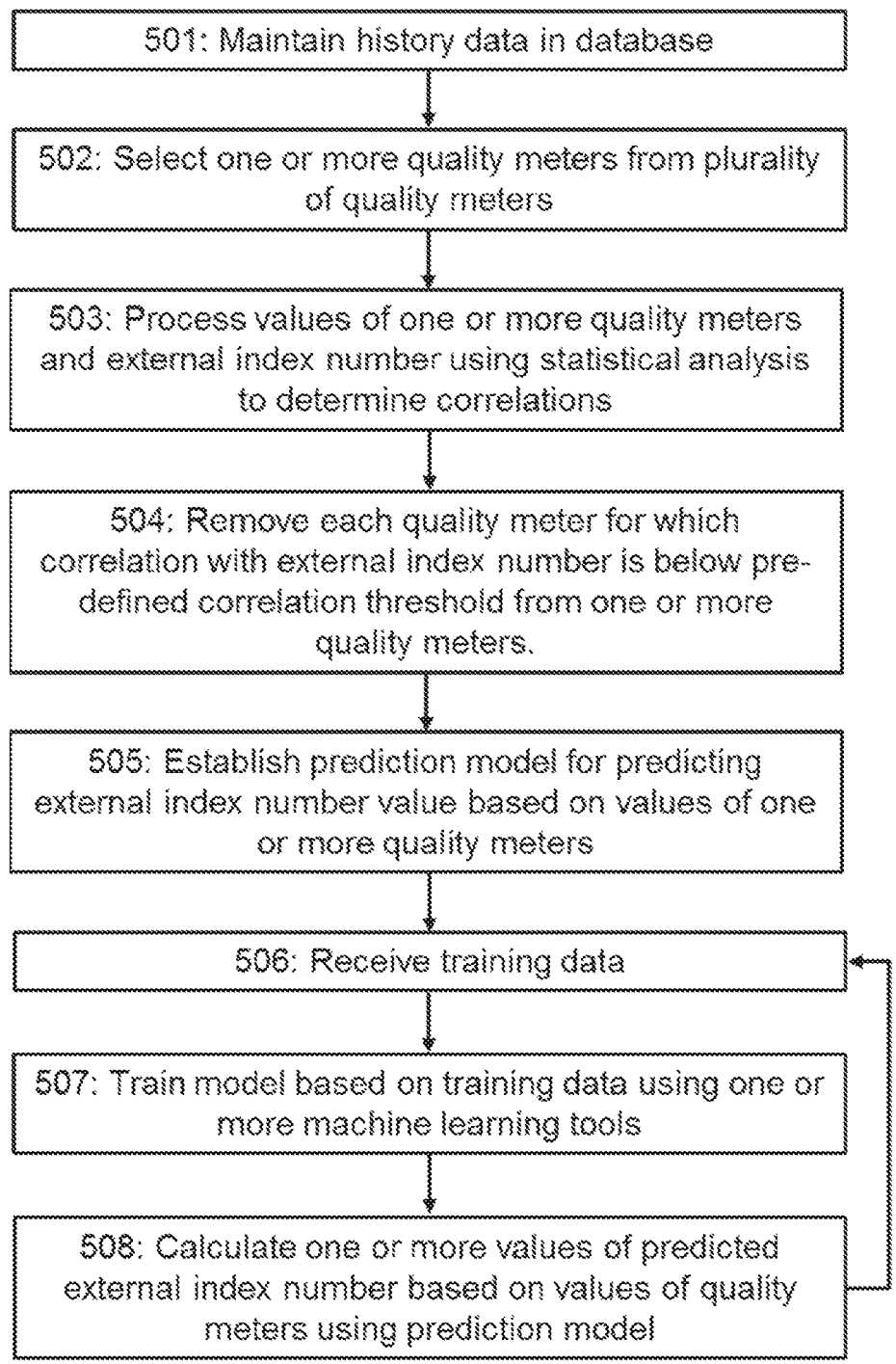
FIG. 5 illustrates a flow diagram according to an embodiment of the invention.

FIG. 5 illustrates another method for realizing and training a model predicting the values of external index number according to an embodiment of the invention. In FIG. 5, the prediction model is also used for predicting the external index number. Similar to FIG. 4, the method may be performed by the QI metrics and analysis layer 120 of FIG. 1 or some of the elements 106, 107, 108, 109 therein and the data warehouse 104.

Referring to FIG. 5, blocks 501, 502, 503 may correspond to blocks 401, 402, 403 of FIG. 4 and will, therefore, not be repeated here for brevity. However, after processing the data in block 503, not all of the one or more quality meters are used for establishing the model according this embodiment of the invention. Instead, the analysis system removes, in block 504, each quality meter for which the dependency coefficient indicating dependency between the quality meter and the external index number has a value or an absolute value below a pre-defined dependency threshold from the one or more quality meters. The dependency coefficient may be any coefficient indicating an extent of a statistical relationship involving dependence between two variables. For example, the dependency coefficient may be a linear correlation coefficient indicating the extent to which two variables have a linear relationship such as a Pearson product-moment correlation coefficient (commonly called simply "the correlation coefficient"). In some embodiments, other criteria for filtering the one or more quality meters may also be defined. For example, maximum and/or minimum number for the number of the one or more quality meters may be defined. Only after the filtering of the one or more quality meters to be used for prediction does the analysis system establish, in block 505, the prediction model for predicting external index number values based on one or more sets of values of the one or more quality meters. Similar to the embodiment illustrated in FIG. 4, the analysis system receives, in block 506, training data and trains, in block 507, the prediction model using one or more machine learning tools. Each time the prediction model is trained, the analysis system calculates, in block 508, one or more values of the predicted external index number based on values of the one or more quality meters using the prediction model. The analysis system may calculate one or more values of predicted external index number corresponding to present or future time instances based on one or more sets of past and/or present values of the one or more quality meters. The analysis system may carry out the calculations according to FIGS. 2 and/or 3. In some embodiments, the analysis system may perform similar calculations also after establishing the model in block 505 based on the history data used for establishing. In other embodiments, the analysis system may perform some of said calculations periodically.

Figure 6:
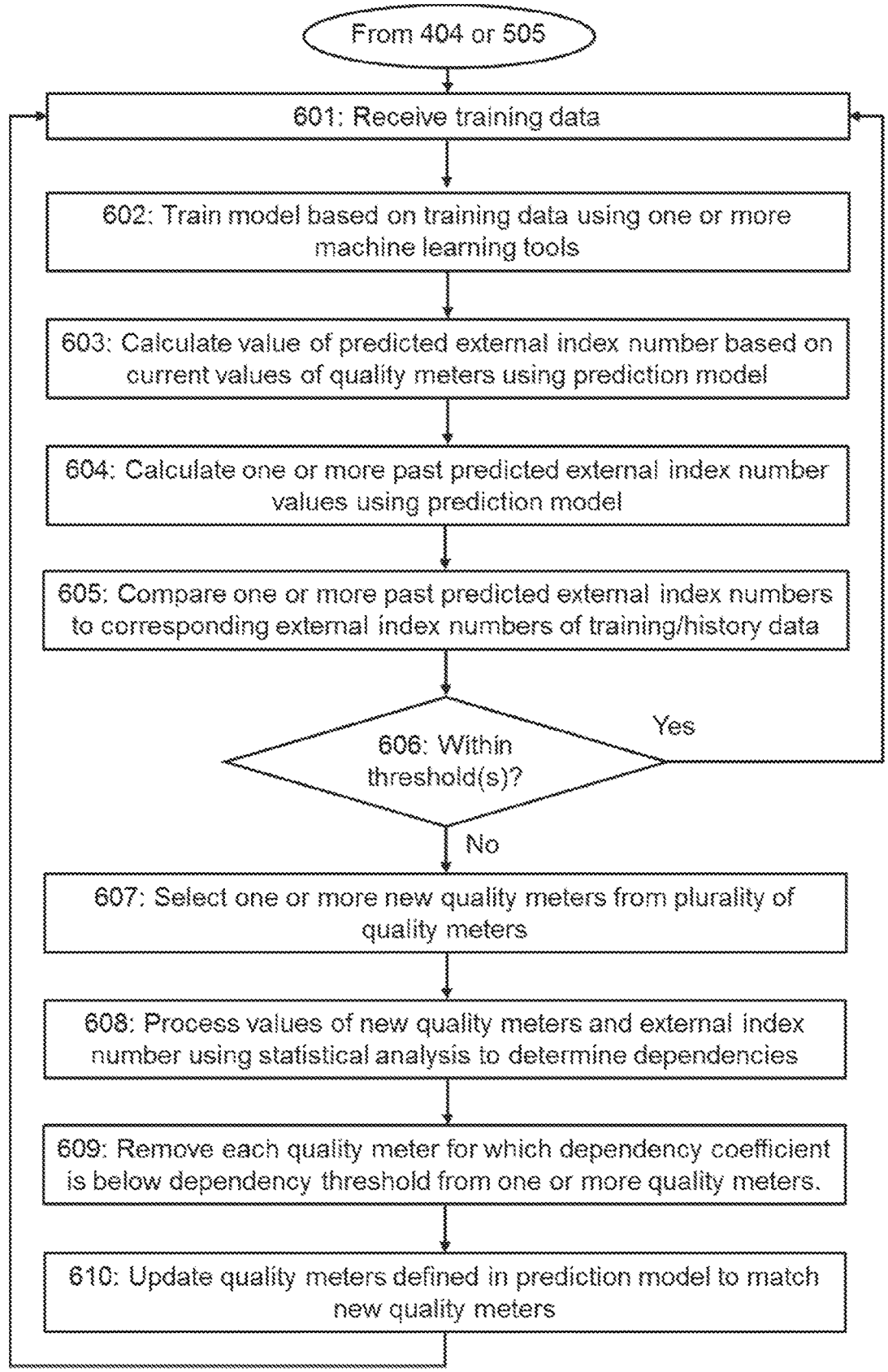
FIG. 6 illustrates a flow diagram according to an embodiment of the invention.

During the operation of the information system which is being analysed by the QI metrics and analysis layer, it may occur that there is a change in the information system such that one or more dependencies between different quality meters and/or between the quality meters and the external index number change. This may be due to a number of factors, for example, a real-life change affecting the behaviour of one or more quality meters such as a redesign of a website from which data is collected by the information system, addition of one or more quality meters or change in the definition of one or more quality meters. The QI metrics and analysis layer may be configured to monitor any such changes as they are reflected in the external index number values and react accordingly to retain accuracy in the external index number calculations. FIG. 6 illustrates a method for correcting the prediction model for the external index number to account for said changes according to an embodiment of the invention. Similar to FIGS. 4 and 5, the method may be performed by the QI metrics and analysis layer 120 of FIG. 1 or some of the elements 106, 107, 108, 109 therein and the data warehouse 104.

In FIG. 6, it is assumed that the prediction model for the external index number has already been established, for example, by carrying out steps 401 to 404 of FIG. 4 or steps 501 to 505 of FIG. 5. Similarly, the steps 601 to 603 may correspond to steps 506 to 508 of FIG. 5 and will not be repeated here for brevity. After said steps, the analysis system calculates, in block 604, using the prediction model one or more past values of the predicted external index number based on one or more past values of the one or more quality meters in the history data. The one or more past values of the predicted external index number and the one or more quality meters may correspond to one or more time instances for which values of external index number (that is, "real" external index number) are available in the history data and may, therefore, be retrieved by the analysis system. The one or more past values may correspond one or more of the most recent values of the external index number available. The analysis system compares, in block 605, values of the one or more past predicted external index numbers to values of corresponding one or more external index numbers comprised in the history data. The comparing may involve evaluating the deviation between the predicted and history values. For example, the deviation may be evaluated by calculating an average absolute deviation or a weighted average absolute deviation such that the more recent values have larger weights. In some embodiments, the deviation may be evaluated separately for each external index number pair comprising corresponding predicted and real external index number values.

If the deviation between the one or more past predicted external index numbers and the one or more past external index numbers exceeds, in block 606, a pre-defined prediction threshold (or multiple pre-defined prediction thresholds), the analysis system performs the following four steps. First, the analysis system selects, in block 607, one or more new quality meters from the plurality of quality meters for predicting values of the external index number. The one or more new quality meters comprise at least the one or more quality meters of the prediction model (that is, the current prediction model). Second, the analysis system processes, in block 608, values of the one or more new quality meters and the external index number comprised in the history data using one or more statistical analysis methods to determine dependencies between the plurality quality meters and the external index number. Third, the analysis system removes, in block 609, each quality meter of the one or more new quality meters for which the dependency coefficient (as defined earlier) has a value or an absolute value below a pre-defined dependency threshold from the one or more new quality meters. Fourthly, the analysis system updates, in block 610, based on the processing, the one or more quality meters defined in the prediction model to match the one or more new quality meters. The end result of the method is, thus, an updated prediction model which takes into account all the most significant quality meters, specifically in view of the current operation of the information system, and omits any quality meters which have become insignificant over time.

Figure 7:
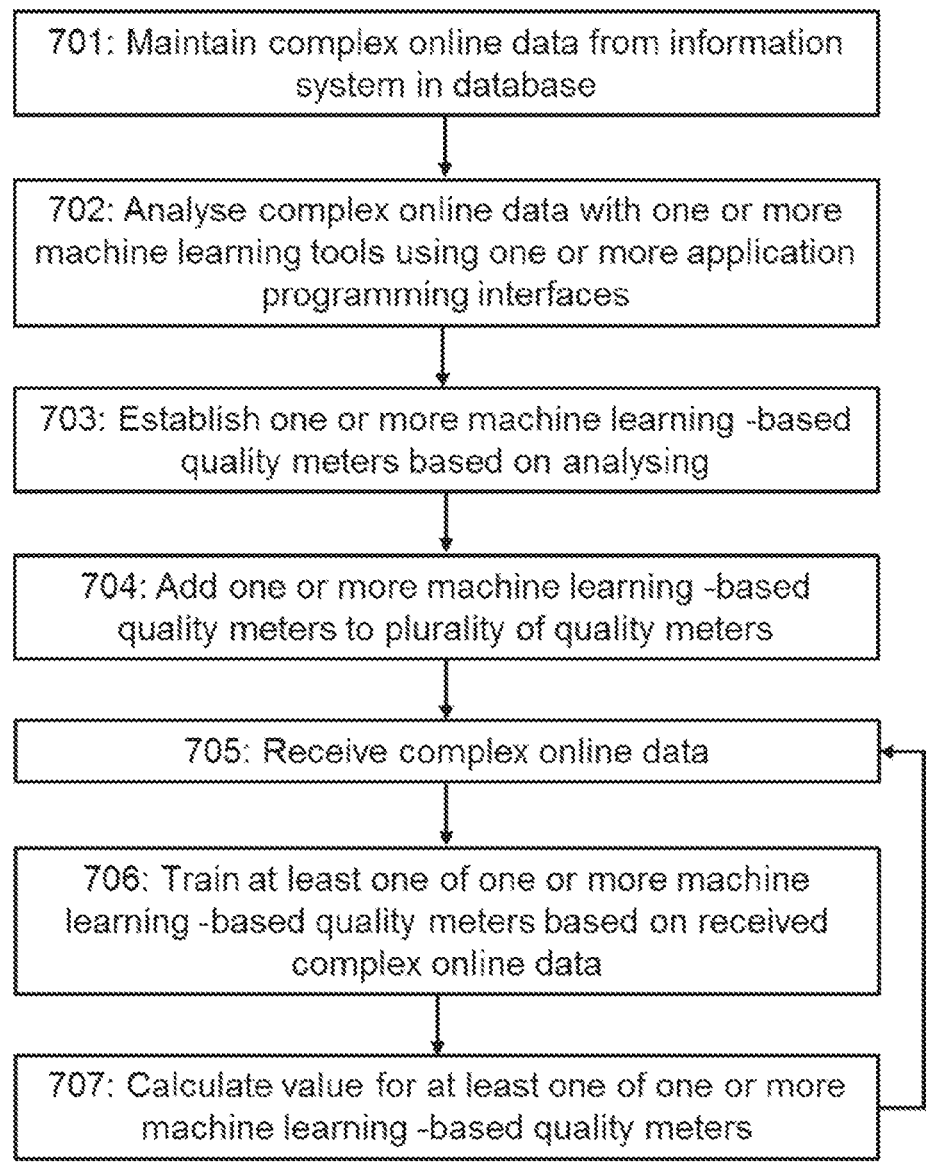
FIG. 7 illustrates a flow diagram according to an embodiment of the invention.

As discussed above, machine learning tools when used in connection with the causal loop diagram comprising the plurality of quality meters describing the information system may enable accurate calculation of current external index number values and even prediction of future external index numbers values. However, this is not the only way in which the machine learning tools may be utilized for improving the quality of the information system. The machine learning tools may also be used for defining new types of quality meters similar to "conventional" QI tools (element 103 of FIG. 1). However, the machine learning-based quality meter may have the added benefit that they may be trained with new data to improve their operation. The new machine learning-based quality meters may be used in the causal loop diagram similar to any other quality meters as well in the prediction model for the external index number, providing further accuracy for the calculation and prediction. An exemplary method for achieving said functionalities according to an embodiment of the invention is illustrated in FIG. 7. Similar to FIGS. 4 to 6, the method may be performed by the QI metrics and analysis layer 120 of FIG. 1 or some of the elements 106, 107, 108, 109 therein and the data warehouse 104. It is assumed in FIG. 7 that at least the method according to FIG. 4 has already been carried out.

Referring to FIG. 7, the analysis system maintains, in block 701, complex online data acquired from the information system in the database (that is, data warehouse). The complex online data may comprise, for example, data of one or more of the following types: image data, video data, speech data, text data and web data. The analysis system analyses, in block 702, the complex online data with the one or more machine learning tools (as described in relation to earlier embodiments) using one or more application programming interfaces of the one or more machine learning tools. Here, the application programming interfaces may relate to one or more of the following: image analysis, video analysis, emotion recognition, speech recognition, semantic or text analysis and web analytics. Based on the analyzing, the analysis system establishes, in block 703, one or more machine learning-based quality meters. For example, a machine learning-based quality meter may evaluate customer satisfaction (perceived quality) by analyzing video data of customer interactions using an emotion recognition application programming interface of a machine learning tool. To give another example, another machine learning-based quality meter may monitor a certain aspect of web traffic on a website using a web analytics application programming interface of a machine learning tool. The analysis system adds, in block 704, the one or more machine learning-based quality meters to the plurality of quality meters comprised in the causal loop diagram. In response to the analysis system receiving, in block 705, more complex online data, the analysis system trains, in block 706, at least one of the one or more machine learning-based quality meters using the one or more machine learning tools and the one or more application programming interfaces of the one or more machine learning tools based on received complex online data and calculates, in block 707, a value for at least one of the one or more machine learning-based quality meters. The steps 705 to 707 are repeated each time new complex online data is received. In some embodiments, only one of the steps 706 and 707 may be performed in response to the receiving.

In some embodiments, the results and/or intermediary results of any of the calculations illustrated in FIGS. 2 to 7 may be automatically displayed to one or more users via the QI dashboard layer.

The blocks, related functions, and information exchanges described above by means of FIGS. 2 to 7 are in no absolute chronological order, and some of them may be performed simultaneously or in an order differing from the given one. For example, the subprocess which is repeated every time training data is received illustrated in steps 405 and 406 of FIG. 4 or in steps 506 to 508 of FIG. 5 may be run simultaneously with the process of FIG. 6 such that said subprocess of FIG. 4 or 5 is performed as a default option while the process of FIG. 6 is performed based on a timer (e.g., once every week) or a counter (e.g., every fourth time training data is received). Other functions can also be executed between the blocks and related functions or within them, and other information may be sent. Some of the blocks or part of the blocks or one or more pieces of information can also be left out or replaced by a corresponding block or part of the block or one or more pieces of information.

Figure 8:
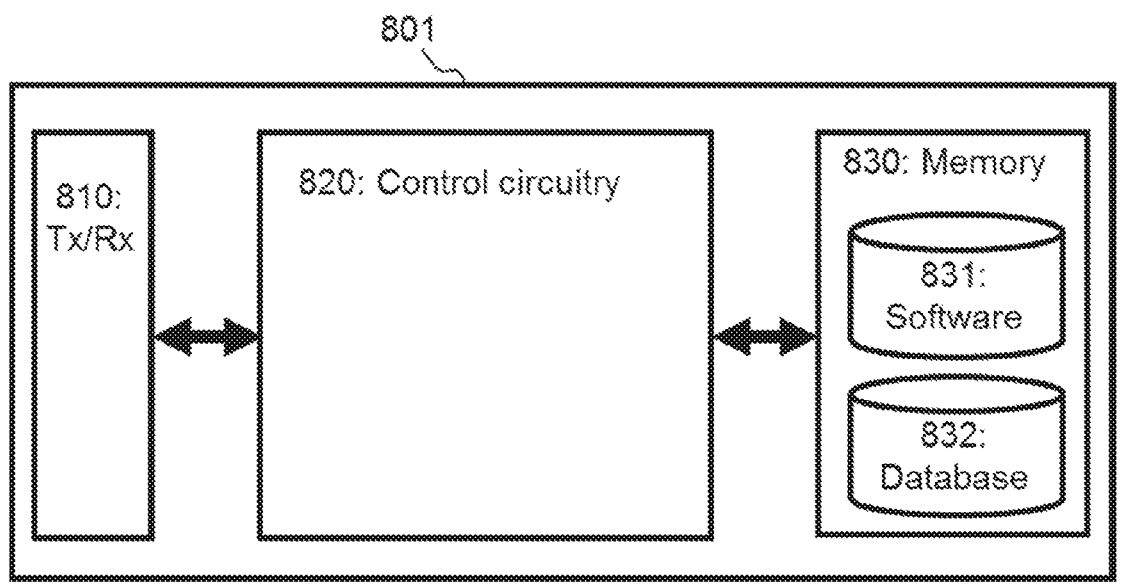
FIG. 8 illustrates a block diagram of an apparatus according to some embodiments of the invention.

FIG. 8 illustrates an apparatus 801 configured to carry out the functions or some of the functions described above in connection with the QI metrics and analysis layer 120, possibly including the data warehouse 104, or one or more of the elements 104, 106, 107, 108, 109 illustrated in FIG. 1. The apparatus 801 may be an electronic device comprising electronic circuitries. The apparatus 801 may be a separate (network) entity or a plurality of separate entities. The apparatus 801 may be connected to a data warehouse 104 and/or to a QI dashboard layer 110. The apparatus 801 may comprise a control circuitry 820 such as at least one processor, and at least one memory 832 including a computer program code (software) 831 wherein the at least one memory and the computer program code (software) are configured, with the at least one processor, to cause the apparatus 801 to carry out any one of the embodiments of the invention described above.

The memory 830 may be implemented using any suitable data storage technology, such as semiconductor-based memory devices, flash memory, magnetic memory devices and systems, optical memory devices and systems, fixed memory and removable memory. The memory may comprise a database 832 which may be or comprise the data warehouse 104 of FIG. 1 or it may a separate database from the data warehouse 104. The memory 830 may be connected to the control circuitry 820 via an interface.

The apparatus 801 may further comprise a communication interface (Tx/Rx) 810 comprising hardware and/or software for realizing communication connectivity according to one or more communication protocols. The communication interface 810 may comprise standard well-known components such as an amplifier, filter, frequency-converter, (de)modulator, and encoder/decoder circuitries and one or more antennas.

A computer program comprising program code means adapted to perform any necessary steps, when the program is run on a processor can implement the invention and its embodiments. Also different kind of mapping procedures and transmitting of information are possible using one or more computer programs. It also is possible to have a computer program product comprising program code means stored in a computer readable medium, the program code means being adapted to perform any of said steps, when the program is run on a computer or on a processor.

All modifications and configurations required for implementing functionality of the embodiments may be performed as routines, which may be implemented as added or updated software routines, application circuits ASIC and/or programmable circuits. Software routines, also called program products, including applets and macros, can be stored in any apparatus-readable data storage medium and they include program instructions to perform particular tasks. Software routines may be downloaded into an apparatus. The apparatus, such as controllers, or corresponding server components, or a user terminal may be configured as a computer including at least a memory for providing storage area used for arithmetic operation and an operation processor for executing the arithmetic operation. An example of the operation processor includes a central processing unit. The memory may be removable memory detachably connected to the apparatus or to information system.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

It will be obvious to a person skilled in the art that, as the technology advances, the inventive concept can be implemented in various ways. The invention and its embodiments are not limited to the examples described above but may vary within the scope of the claims.

SEQUENCE LISTING

Not Applicable.

The invention claimed is:

1. A computer implemented method of performing predictive analysis on an external index number describing perceived quality of an information system comprising one or more of information technology systems, communications systems and access networks and producing information quantifiable by a plurality of quality meters, the method comprising:
maintaining, in a database, a dynamic causal loop diagram of the plurality of quality meters describing the information system, wherein the dynamic causal loop diagram of the plurality of quality meters comprises present information on values of the plurality of quality meters and interactions with their strengths between the plurality of quality meters;
maintaining, in the database, history data comprising information on past and present values of the plurality of quality meters and the external index number and interactions with their strengths between the plurality of quality meters;

selecting one or more quality meters from the plurality of quality meters of the dynamic causal loop diagram for predicting values of the external index number, wherein the selecting is based at least on the dynamic causal loop diagram;

processing values of the one or more quality meters and the external index number comprised in the history data using one or more statistical analysis methods to determine dependencies between the plurality of quality meters and the external index number;

establishing, based on the processing, a prediction model for predicting external index number values based on one or more sets of values of the one or more quality meters;

in response to receiving training data comprising at least one value for the external index number and one corresponding set of values for the one or more quality meters, training the prediction model using one or more machine learning tools based on received training data;

calculating, using the prediction model, a present predicted external index number value based on present values of the one or more quality meters; and causing displaying the present predicted external index number to one or more users via one or more displays of one or more user equipment for manacling quality of the information system.

2. The method of claim 1, wherein the calculating the present predicted external index number value is based also on one or more sets of past values of the one or more quality meters.

3. The method of claim 1, further comprising:
calculating, using the prediction model, values for one or more uncertainty metrics describing uncertainty in the calculation of the present predicted external index number value.

4. The method of claim 1, further comprising:
calculating, using the prediction model, a future predicted external index number value corresponding to a future time instance based on one or more sets values of the one or more quality meters.

5. The method of claim 4, further comprising:
calculating, using the prediction model, a value for one or more uncertainty metrics describing uncertainty in the calculation of the future predicted external index number value.

6. The method of claim 1, further comprising:
after the establishing, training the prediction model using the one or more machine learning tools based on the history data.

7. The method according to claim 1, wherein the one or more statistical analysis methods comprise one or more methods based on one or more of the following: regression analysis, correlation analysis and structural equations modelling.

8. The method of claim 1, wherein the determining the dependencies comprises calculating values for a dependency coefficient indicating an extent of a statistical relationship involving dependence between a quality meter of the plurality of quality meters and the external index number, the dependency coefficient being one of the following types: a linear correlation coefficient, a non-linear correlation coefficient, a linear regression coefficient and a non-linear regression coefficient.

9. The method of claim 8, further comprising:
before the establishing, removing each quality meter of the one or more quality meters for which the dependency coefficient has a value or an absolute value below a pre-defined dependency threshold from the one or more quality meters.

10. The method of claim 8, further comprising:
calculating, by using the prediction model, one or more past values of the predicted external index number based on one or more past values of the one or more quality meters in the history data, wherein the one or more past values of the predicted external index number and the one or more quality meters correspond to one or more time instances for which values of external index number are available in the history data;

comparing values of the one or more past predicted external index numbers to values of corresponding one or more external index numbers comprised in the history data; and in response to a deviation between the one or more past predicted external index numbers and the one or more past external index numbers exceeding a pre-defined prediction threshold, performing the following:

selecting one or more new quality meters from the plurality of quality meters for predicting values of the external index number, wherein the one or more new quality meters comprise at least the one or more quality meters of the prediction model;

processing values of the one or more new quality meters and the external index number comprised in the history data using one or more statistical analysis methods to determine dependencies between the plurality quality meters and the external index number;

removing each quality meter of the one or more new quality meters for which the dependency coefficient has a value below a pre-defined dependency threshold from the one or more new quality meters; and updating, based on the processing, the one or more quality meters defined in the prediction model to match the one or more new quality meters.

11. The method of claim 1, wherein the external index number, the history data and the training data comprise metadata, the metadata comprising at least information on one of the following: data type, location where data was acquired, time of data and to which pre-defined category data belongs.

12. The method of claim 11, further comprising:
in response to receiving incomplete training data comprising at least one value for the external index number, retrieving at least one set of values for the one or more quality meters corresponding to the at least one value for the external index number from the database based on the metadata of the incomplete training data and the metadata of the history data and training the prediction model using the one or more machine learning tools based on the incomplete training data and the at least one set of values for the one or more quality meters retrieved from the database.

13. The method of claim 1, further comprising:
maintaining complex online data from the information system in the database, wherein the complex online data comprises data of one or more of the following types: image data, video data, speech data, text data and web data;

analysing the complex online data with the one or more machine learning tools using one or more application programming interfaces of the one or more machine learning tools, wherein the one or more application programming interfaces relate to one or more of the following: image analysis, video analysis, emotion recognition, speech recognition, semantic or text analysis and web analytics;

establishing one or more machine learning-based quality meters based on the analysing; and adding the one or more machine learning-based quality meters to the plurality of quality meters.

14. The method of claim 13, further comprising:
in response to receiving more complex online data, training at least one of the one or more machine learning-based quality meters using the one or more machine learning tools and the one or more application programming interfaces of the one or more machine learning tools based on received complex online data.

15. The method of claim 13, further comprising:
in response to receiving more complex online data, calculating a value for at least one of the one or more machine learning-based quality meters.

16. The method of claim 1, wherein the external index number is the Net Promoter Score or some other survey-based customer satisfaction metric.

17. An apparatus for performing predictive analysis on an external index number describing quality of an information system comprising one or more of information technology systems, communications systems and access networks and producing information quantifiable by a plurality of quality meters, the apparatus comprising:

at least one processor, and at least one memory comprising a computer program code, wherein the processor, the memory, and the computer program code are configured to cause the apparatus to perform:

maintaining, in the at least one memory, a dynamic causal loop diagram of the plurality of quality meters describing the information system, wherein the dynamic causal loop diagram of the plurality of quality meters comprises present information on values of the plurality of quality meters and interactions with their strengths between the plurality of quality meters;

maintaining, in the at least one memory, history data comprising information on past and present values of the plurality of quality meters and the external index number and interactions with their strengths between the plurality of quality meters;

selecting one or more quality meters from the plurality of quality meters of the dynamic causal loop diagram for predicting values of the external index number, wherein the selecting is based at least on the dynamic causal loop diagram;

processing values of the one or more quality meters and the external index number comprised in the history data using one or more statistical analysis methods to determine dependencies between the plurality of quality meters and the external index number;

establishing, based on the processing, a prediction model for predicting external index number values based on one or more sets of values of the one or more quality meters;

in response to receiving training data comprising at least one value for the external index number and one corresponding set of values for the one or more quality meters, training the prediction model using one or more machine learning tools based on received training data;

calculating, using the prediction model, a present predicted external index number value based on present values of the one or more quality meters; and causing displaying the present predicted external index number to one or more users via one or more displays of one or more user equipment for managing quality of the information system.

18. A non-transitory computer-readable medium comprising program code instructions for a data processing apparatus of performing predictive analysis on an external index number describing quality of an information system comprising one or more of information technology systems, communications systems and access networks and producing information quantifiable by a plurality of quality meters, wherein execution of the program code instructions causes the data processing apparatus to perform the acts of:

maintaining, in a database, a dynamic causal loop diagram of the plurality of quality meters describing the information system, wherein the dynamic causal loop diagram of the plurality of quality meters comprises present information on values of the plurality of quality meters and interactions with their strengths between the plurality of quality meters;

maintaining, in the database, history data comprising information on past and present values of the plurality of quality meters and the external index number and interactions with their strengths between the plurality of quality meters;

selecting one or more quality meters from the plurality of quality meters of the dynamic causal loop diagram for predicting values of the external index number, wherein the selecting is based at least on the dynamic causal loop diagram;

processing values of the one or more quality meters and the external index number comprised in the history data using one or more statistical analysis methods to determine dependencies between the plurality of quality meters and the external index number;

establishing, based on the processing, a prediction model for predicting external index number values based on one or more sets of values of the one or more quality meters;

in response to receiving training data comprising at least one value for the external index number and one corresponding set of values for the one or more quality meters, training the prediction model using one or more machine learning tools based on received training data;

calculating, using the prediction model, a present predicted external index number value based on present values of the one or more quality meters; and causing displaying the present predicted external index number to one or more users via one or more displays of one or more user equipment for managing quality of the information system.

* * * * *